(12) United States Patent  
Ren et al.

(10) Patent No.: US 8,475,311 B2  
(45) Date of Patent: Jul. 2, 2013

(54) HYBRID POWER DRIVING SYSTEM AND GEAR POSITION OPERATION METHOD THEREOF

(75) Inventors: Yi Ren, Shenzhen (CN); Shenglin Yang, Shenzhen (CN); Jun Li, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 288 days.

(21) Appl. No.: 12/978,167

(22) Filed: Dec. 23, 2010

(65) Prior Publication Data

US 2011/0160015 A1    Jun. 30, 2011

(30) Foreign Application Priority Data

Dec. 25, 2009 (CN) .......................... 2009 1 0249543

(51) Int. Cl.  
*F16H 3/72*    (2006.01)

(52) U.S. Cl.  
USPC ................ 475/5; 475/206; 475/311; 475/317

(58) Field of Classification Search  
USPC ............. 475/5, 204, 206, 296, 311, 314, 317, 475/320; 903/910  
See application file for complete search history.

(56) References Cited

U.S. PATENT DOCUMENTS

| | | | |
|---|---|---|---|
| 6,155,364 A * | 12/2000 | Nagano et al. ........... | 180/65.235 |
| 2003/0106729 A1* | 6/2003 | Noreikat et al. ............ | 180/65.7 |
| 2004/0220015 A1* | 11/2004 | Murakami et al. .............. | 477/15 |
| 2006/0025264 A1* | 2/2006 | Sowul et al. ....................... | 475/5 |
| 2006/0102409 A1* | 5/2006 | Kamada et al. ............... | 180/249 |
| 2008/0125264 A1* | 5/2008 | Conlon et al. .................... | 475/5 |
| 2009/0098969 A1* | 4/2009 | Tabata et al. ...................... | 475/5 |
| 2009/0250278 A1* | 10/2009 | Kawasaki et al. ........ | 180/65.275 |
| 2011/0021300 A1* | 1/2011 | Grochowski et al. ............. | 475/5 |

FOREIGN PATENT DOCUMENTS

CM    2693516 Y    12/2009

* cited by examiner

*Primary Examiner* — Justin Holmes  
*Assistant Examiner* — Huan Le  
(74) *Attorney, Agent, or Firm* — Squire Sanders (US) LLP

(57) ABSTRACT

A hybrid power driving system for a vehicle comprises an internal-combustion engine, a first electric motor, a second electric motor, a planetary coupling mechanism, a speed-reduction mechanism and a differential mechanism. An output shaft of the internal-combustion engine is connected with an input shaft of the first electric motor, and an output shaft of the first electric motor is connected with an output shaft of the second electric motor via a first clutch. The output shaft of the second electric motor is connected with one of a sun gear and a ring gear of the planetary coupling mechanism at a position of the output shaft along its axial direction. And the output shaft of the second electric motor is connected with the other one of a sun gear and a ring gear at another position of the output shaft along the axial direction via a second clutch.

18 Claims, 2 Drawing Sheets

HYBRID POWER DRIVING SYSTEM AND GEAR POSITION OPERATION METHOD THEREOF

CROSS-REFERENCE TO RELATED APPLICATIONS

The present application claims priority to and the benefit of Chinese Patent Application No. 200910249543.6 filed with Chinese State Intellectual Property Office on Dec. 25, 2009, the entirety of which is hereby incorporated by reference.

BACKGROUND

1. Technical Field

The present invention relates to a hybrid power driving system of a vehicle, in particularly, to a hybrid power driving system including a planetary coupling mechanism and a speed-reduction mechanism, moreover, to a gear position operation method thereof.

2. Description of the Related Art

The requirements on motor vehicle emissions have become increasingly strict. The performance of pure electric vehicles (EV) may not meet the power requirements under certain conditions. Hybrid power vehicles (HEV) have developed quickly because of their advantages in power performance and environment protection.

A hybrid power vehicle has two different power sources: an electric motor and an internal-combustion engine. A hybrid power driving system can be classified in different types: a serial drive system, a parallel drive system and a series-parallel power drive system. In a serial drive system, an internal-combustion engine drives an electric generator to generate electricity which is used to drive an electric motor. The electric motor in turn provides power to the vehicle. In a parallel drive system, an internal-combustion engine and an electric motor together drive the vehicle. The engine and motor belong to two systems, and may separately provide torques to a transmission system of the vehicle and may separately or together drive the vehicle under different road conditions. In a series-parallel power drive system, the power of an internal-combustion engine and the power of an electric motor are combined and then sent to a transmission system of the vehicle. Due to developments in power coupling technology and electric motor-generator conversion technology, there are more and more types of series-parallel power drive systems.

The electric motor-generator conversion technology is quite mature at this time. Its main principle is that by adding a circuit conversion component, an electric motor may be used not only as a motor but also as a generator. For example, for a direct current motor, the working principle of a direct current motor and that of a permanent magnet generator are all based on the electromagnetic induction principle. The difference is just that, for the direct current motor, the motor rotor is subject to a force in a magnetic field when an electric current passes through the motor rotor; for the permanent magnet generator, the rotor of the generator is rotated to cut through magnetic field lines to produce a current. Thus, adding circuit conversion components and the brushes of a direct current motor to a permanent magnet generator allows an electric motor to selectively operate as a generator or a motor. This device is called a motor-generator unit, in short a "motor-generator."

Moreover, one of the important technologies concerning the series-parallel driving system is the power coupling technology for the internal-combustion engine and the electric motor. For example, Chinese patent CN2693516Y discloses a hybrid power driving system for a vehicle. As shown in FIG. 3, the driving system includes an internal-combustion engine 100, an electric motor 200 and a planetary gear mechanism used as the power coupling mechanism. The planetary gear mechanism includes a ring gear 400, a planet carrier 500 and a sun gear 600. The electric motor 200 transmits power to the ring gear 400 via a gear designated by reference numeral 300, and the internal-combustion engine 100 transmits power to the sun gear 600. Then the powers from the electric motor 200 and the internal combustion engine 100 are combined via the planet carrier 500 and transmitted to the driving system of the vehicle.

As is known, the rotational speed of the internal-combustion engine or motor is quite high. Before the rotation of the internal-combustion engine or motor is transmitted to a driving wheel of the vehicle, the speed is reduced and the torque is increased by a speed-reduction mechanism. This is true for a hybrid power vehicle. This speed-reduction mechanism is mainly composed of a speed-reduction gear system. The reduction ratio is fixed after the manufacture of the speed-reduction gear system. In order to satisfy the need of speed reduction and torque increase for the vehicle under different operating conditions, a traditional drive system, driven by only an internal-combustion engine, has a transmission for different gear positions. However, for a hybrid power drive vehicle, due to the arrangement of the power units (the internal-combustion engine and electric motor) and the limitations imposed by the power coupling mechanism, the use of a transmission not only complicates the structure of the driving system but also makes it more difficult to assemble. Therefore, the reverse gear for the hybrid power vehicle is mainly realized by controlling the forward and reverse rotation of the electric motor, and the speed of the vehicle is varied mainly by adjusting the rotational speed of the motor in a way similar to that of a continuously variable transmission. Accordingly, the output rotational speed of the electric motor is varied by changing the output power of the electric motor.

However, this method for varying speed cannot satisfy a vehicle's need under different operating conditions. For example, for the hybrid power driving system disclosed in the aforementioned patent CN2693516Y, when the vehicle is climbing a slope (assuming that the gradient of the slope is the maximum gradient that the vehicle with a full load can climb), the combined output power of the internal-combustion engine 100 and electric motor 200 needs to be at the maximum value. This requires the output rotational speed of the electric motor 200 to be at the maximum value. But the output rotational speed of the electric motor 200 must be reduced by a speed-reduction mechanism to increase the torque to drive the vehicle to climb the slope (especially when the vehicle with a full load has a large mass). To satisfy this operating condition, the reduction ratio of the speed-reduction mechanism must be quite large. However, a large reduction ratio for the speed-reduction mechanism of the hybrid power driving system does not meet the needs of the vehicle in other operating conditions. For example, when the vehicle travels at a high speed on a flat road with no load, even if the rotational speed of the combination of the motor 200 and internal-combustion engine 100 is at the maximum value, the vehicle speed may still be too low because of the large speed reduction ratio of the speed-reduction mechanism.

From the aforementioned, the conventional method for varying the speed of a hybrid power vehicle does not satisfy the need of a vehicle under different operating conditions. This has always been a difficult problem in the design of a hybrid power vehicle.

SUMMARY

The present invention is directed to solve at least one of the problems in the prior art.

Accordingly, the present invention provides a hybrid power driving system of a vehicle, which not only satisfies the gear position operation of a vehicle but also provides the forward gear with two reduction ratios under different operating conditions to satisfy the driving need of a vehicle under different operating conditions.

According to an embodiment of the present invention, in order to solve the above problem, a hybrid power driving system of a vehicle comprises an internal-combustion engine, a first electric motor, a second electric motor, a planetary coupling mechanism, a speed-reduction mechanism and a differential mechanism. In the hybrid power driving system, an output shaft of the internal-combustion engine is connected with an input shaft of the first electric motor, and an output shaft of the first electric motor is connected with an output shaft of the second electric motor via a first clutch. The output shaft of the second electric motor is connected at a position of the output shaft along its axial direction with one of a sun gear and a ring gear of the planetary coupling mechanism. And the output shaft of the second electric motor is connected at another position along its axial direction with the other of the sun gear and ring gear via a second clutch. The other of the sun gear and ring gear has a brake. The planet carrier of the planetary coupling mechanism is connected to an input gear of the speed-reduction mechanism, and an output gear of the speed-reduction mechanism is connected to a case of the differential mechanism.

According to another embodiment of the present invention, a gear position operation method of the hybrid power driving system is provided. According to this method, during a vehicle's forward movement, by disengaging the second clutch and applying the brake, the hybrid power driving system is put in the first forward gear. By engaging the second clutch and disengaging the brake, the hybrid power driving system is put in the second forward gear. During a vehicle's backward movement, by disengaging the first and second clutches and applying the brake, the hybrid power driving system is put in the reverse gear.

When a vehicle is stationary, by disengaging the first clutch, the second clutch and the brake, the hybrid power driving system is put in the neutral position. When the vehicle is in the parking and power generation mode, by disengaging the first clutch, the internal-combustion engine can be used to drive the first electric motor-generator to generate electricity.

According to the above hybrid power driving system of the present invention, the planetary coupling mechanism can be used to decelerate and to provide the two forward gears to reduce the reduction ratio of the speed-reduction mechanism, allowing the driving need of the vehicle to be met under different operating conditions. For example, when the vehicle is climbing up a slope with a full load, the first forward gear may be adopted, allowing the output rotational speed of the second electric motor and/or the internal-combustion engine to be greatly decreased by both the planetary coupling mechanism and the speed-reduction mechanism to achieve decreased speed and increased torque. When the vehicle travels on a flat road, the second forward gear may be adopted, allowing the output rotational speed of the second electric motor and/or the internal-combustion engine to be decreased by only the speed-reduction mechanism to drive the vehicle at an ideal speed. Meanwhile, reducing the reduction ratio of the speed-reduction mechanism may reduce the number and sizes of the gears, as well as the coat. As a result, according to the different operating conditions of a vehicle, the hybrid power driving system of the vehicle may have a flexible choice of multiple operating conditions and corresponding gear positions. Moreover, a hybrid power driving system having two adjustable forward gears may increase the torque provided to the vehicle and start the vehicle more quickly at a low speed. At a high speed, the maximum efficiency point of the electric motor and engine may be more frequently used to improve the conversion efficiency of the electric energy and reduce exhaust emission and energy loss.

BRIEF DESCRIPTION OF THE DRAWINGS

Embodiments of the invention are diagrammatically indicated in the appended drawings. In these drawings.

Figure 1:
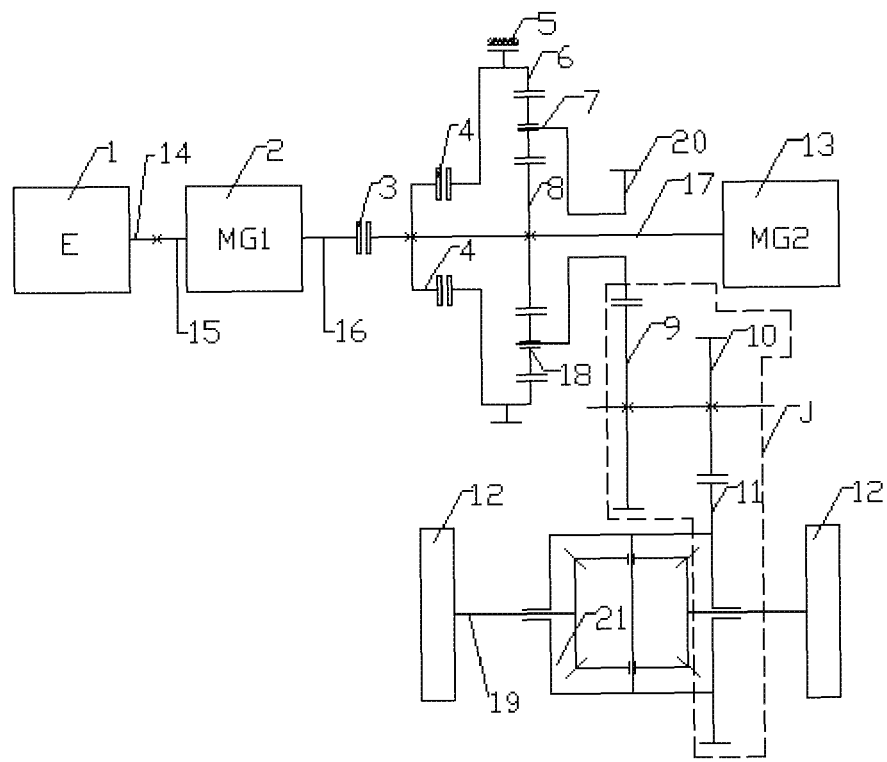
FIG. 1 is a schematic view of a hybrid power driving system of a vehicle according to an embodiment of the present invention, the character "X" thereof representing a fixed connection.

The reference numerals of the main components in the figures are as follows:

| | |
|---|---|
| 1: | internal-combustion engine |
| 2: | first electric motor |
| 3: | first clutch |
| 4: | second clutch |
| 5: | brake |
| 6: | ring gear |
| 7: | planet carrier |
| 8: | sun gear |
| 9: | first driven gear |
| 10: | second driving gear |
| 11: | second driven gear (output gear) |
| 12: | driving wheel |
| 13: | second electric motor |
| 14: | output shaft of the internal-combustion engine |
| 15: | input shaft of the first electric motor |
| 16: | output shaft of the first electric motor |
| 17: | output shaft of the second electric motor |
| 18: | planetary gear |
| 19: | half shaft |
| 20: | first driving gear (input gear) |
| 21: | differential mechanism |
| J: | speed-reduction mechanism |

DETAILED DESCRIPTION

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

According to an embodiment of the present invention, FIG. 1 shows a hybrid power driving system that uses a second electric motor 13 as the main power supply. The hybrid power driving system may mainly include an internal-combustion engine 1, a first electric motor 2, the second electric motor 13, a planetary coupling mechanism, a speed-reduction mechanism J and a differential mechanism 21. Preferably, the output shaft 14 of the internal-combustion engine 1, the input shaft 15 and output shaft 16 of the first electric motor 2, a center line of the planetary coupling mechanism and the output shaft 17 of the second electric motor 13 are all arranged on the same axis. And more particularly, the internal-combustion engine 1 and the first electric motor 2 are preferably located on one side of the planetary coupling mechanism and the second electric motor 13 is located on the other side of the planetary coupling mechanism.

The arrangement of the hybrid power driving system's components will be described particularly hereinafter.

Firstly, the first electric motor 2 and second electric motor 13 are not only connected mechanically as shown in FIG. 1 but also connected by one or more electric circuits (not shown in the figures) as is well known. The first electric motor 2 and second electric motor 13 are respectively connected to a control device electrically and connected to a battery pack by the control device. The control device may switch the direction of the electric current and control the value of the current. For example, when the first electric motor 2 functions as a generator, the current produced by the first electric motor 2 may flow through the control device to the battery pack for storage, and/or the control device may supply the current to the second electric motor 13 to drive the second electric motor 13. This circuit connection and the control device allow a hybrid power driving system to have different operating modes. This is widely used in hybrid power driving systems and therefore will not be described further.

In the embodiment shown in FIG. 1, the output shaft 14 of the internal-combustion engine 1 is connected to the input shaft 15 of the first electric motor 2. In some embodiments, this connection may be made using any suitable method such as a coupling, a flange and so on. The output shaft 16 of the first electric motor 2 is connected to the input shaft 17 of the second electric motor 13 via a first clutch 3. The first clutch 3 may be a clutch of any suitable type, such as a friction disc clutch. The control mechanism for the first clutch 3 (not shown in the figures) may be a hydraulic control mechanism, pressure control mechanism, mechanical control mechanism etc. When the first clutch 3 is a diaphragm spring clutch, the control mechanism may use the mechanical control mechanism including a shift lever and a release bearing. The specific structure may be selected according to vehicle types.

As shown in FIG. 1, at different axial positions on the output shaft 17 of the second electric motor 13, the sun gear 8 and the ring gear 6 of the planetary coupling mechanism may be respectively connected to the output shaft 17 of the second electric motor 13. The connection with the sun gear 8 may use a tooth and keyway connection, a splined connection, and etc. And the connection with the ring gear 6 may be an indirect connection via a second clutch 4. As a result, the output shaft 17 of the second electric motor 13 may be selectively connected or disconnected with the ring gear 6 via the second clutch 4. The clutch 4 may be of any suitable type. For example, as shown in FIG. 1, the second clutch 4 is a friction disc clutch that may include a clutch housing, a driving friction disc and a driven friction disc. The output shaft 17 of the second electric motor 13 may be connected to the clutch housing, passing through the hollow clutch housing. The driving friction disc and driven friction disc may be all annular with the driving friction disc placed on the clutch cover and the driven friction disc correspondingly placed on the ring gear 6. With the operation of the clutch operation mechanism (not shown in the figures), the driving friction disc may be moved along the axial direction of the clutch cover to engage or disengage with the driven friction disc. It is within the skill of an ordinary artisan to use different types of clutches to accomplish the same functions.

The planetary coupling mechanism is mainly used to combine the power outputs from the internal-combustion engine 1, the first electric motor 2 and the second electric motor 13. In this embodiment of the present invention, the planetary coupling mechanism is not only used as a power coupling mechanism but also used as an adjusting mechanism for adjusting the speed ratios of the vehicle forward gears using the second clutch 4 and a brake 5. As shown in FIG. 1, the ring gear 6 has a brake 5 which may have a similar structure and may be based on the same principle as a commonly-used vehicle brake. A brake shoe or a brake block may be arranged along the length of the peripheral surface of the ring gear 6 and may be manipulated by the hydraulic control mechanism (not shown) to engage or disengage with the peripheral surface of the ring gear 6 to stop the ring gear 6 from rotating or to allow the ring gear 6 to rotate freely.

As is well known, the planetary coupling mechanism may include the ring gear 6, a planet carrier 7 having multiple planetary gears 18 and a sun gear 8, wherein the planetary gears 18 mesh with, and are placed between, the sun gear 8 and the ring gear 7. As shown in FIG. 1, the planet carrier 7, used as an output shaft of the planetary coupling mechanism, is connected with the first driving gear 20 of the speed-reduction mechanism J. The dashed line in FIG. 1 (and FIG. 2) shows the speed-reduction mechanism, which may be different from the actual shape of the speed-reduction mechanism. The planet carrier 7 and the first driving gear 20 (i.e., the input shaft of the speed-reduction mechanism) may be configured as one body, and the planet carrier 7 may often be connected to the gear shaft of the first driving gear 20 (i.e., the input shaft of the speed-reduction mechanism or the connecting shaft between the planet carrier 7 and the first driving gear 20) to drive the gear pair in the speed-reduction mechanism to decrease speed and increase torque. In the structure shown in FIG. 1, the shaft connecting the planet carrier 7 and the first driving gear 20 may be hollow to allow the output shaft 17 of the second electric motor 13 to pass through. The aforementioned is only a specific structure of one embodiment of the present invention. Other embodiments of the present invention may have different or similar arrangements.

According to an embodiment of the present invention, the speed-reduction mechanism J may have more than one gear pair, and speed reduction may be realized by meshing multistage gear pairs. For example, as shown in FIG. 1, the speed-reduction mechanism J includes two gear pairs, The meshing between the first driving gear 20 and the first driven gear 9 may realize the first grade reduction (the tooth number of the first driving gear 20 is less than the tooth number of the first driven gear 9), and the meshing between the second driven gear 10, which is coaxially mounted with the first driven gear 9, and the second driven gear 11 may realize the second grade reduction (the tooth number of the second gear 10 is less than the tooth number of the driven gear 11). The second driven gear 11 (i.e., the output shaft of the speed-reduction mechanism) may be connected to the case of the differential mechanism 21 that is connected to a driving wheel 12 of the vehicle via a half shaft 19.

It should be noted that FIG. 1 (and FIG. 2) is only a schematic view and omits some components such as support bearings and so on. However, it is within the skill of an ordinary artisan to add the necessary components in an actual assembly.

The following describes how the structure in FIG. 1 is used to implement two forward gears of the vehicle:

As is well known, the following formula describes the planetary coupling mechanism:

$$n1 + n3 \cdot K = (1+K) \cdot n2$$

where n1 is the rotational speed of the sun gear 8; n2 is the rotational speed of the planet carrier 7; n3 is the rotational speed of the ring gear 6; and K is the ratio of the tooth number of the ring gear and the tooth number of the sun gear.

As shown in FIG. 1, when the brake 5 is applied to fix the ring gear 6 and the second clutch 4 is disengaged, the rotational speed n3 of the ring gear 6 is zero, reducing the above formula to the following formula (2):

$$n1 = (1+K) \cdot n2$$

where the reduction ratio of the planetary coupling mechanism is $i_1 = n1/n2 = 1+K$. Since the reduction ratio of the speed-reduction mechanism J is a predetermined value $i_2$ (FIG. 1 shows a two-stage speed-reduction mechanism, although it could also be a one-stage speed-reduction mechanism or a multiple stage speed-reduction mechanism), the reduction ratio of the entire hybrid power driving system is $I = i_1 \cdot i_2 = (1+K) \cdot i_2$, which is the reduction ratio of the first forward gear of the hybrid power driving system in FIG. 1. The entire reduction ratio is quite large and is particularly suitable for operating conditions where greatly decreased speed and increased torque are needed, such as when the vehicle climbs a slope at a low speed.

In addition, according to FIG. 1, when the second clutch 4 is engaged and the brake 5 is disengaged, the ring gear 6 is connected with the sun gear 8 as one body via the output shaft 17 of the second electric motor 13. In this case, n1=n3 in the above formula (1), resulting in the following formula (3):

$$n1 + n1 \cdot K = (1+K) \cdot n2$$

That is, n1=n2. In other words, when the planetary coupling mechanism is in this situation, the rotational speeds of the sun gear 8, the planet carrier 7 and the ring gear 6 are equal, resulting in direct transmission and the reduction ratio of the planetary coupling mechanism $i_1 = 1$. In this case, the reduction ratio of the entire hybrid power driving system is $I = i_1 \cdot i_2 = i_2$, which is the reduction ratio of the second forward gear of the hybrid power driving system in FIG. 1. This reduction ratio is quite small (only dependent on the reduction ratio $i_2$ of the speed-reduction mechanism J), which is suitable to a high speed operating condition of the vehicle.

From the aforementioned analysis, with the hybrid power driving system according to embodiments of the present invention, because the planetary coupling mechanism may be used for speed reduction and may provide two forward gears of the vehicle, the reduction ratio of the speed-reduction mechanism J may be reduced to meet the vehicle's driving needs under different operating conditions. For example, when the vehicle is climbing a slope with a full load, the reduction ratio of the first forward gear allows the rotational speed of the second electric motor 13 (or the speeds of the internal-combustion engine 1, the first electric motor 2 and the second electric motor 13 in a series-parallel mode) to be greatly reduced by the combination of the planetary coupling mechanism and the speed-reduction mechanism, so as to reduce speed and increase torque. When the vehicle travels on a flat road, the reduction ratio of the second forward gear allows the rotational speed of the second electric motor 13 (or the speeds of the internal-combustion engine 1, the first electric motor 2 and the second electric motor 13 in the series-parallel mode) to be reduced by only the speed-reduction mechanism J, so as to allow the vehicle to travel at an ideal speed. Also, because the reduction ratio of the speed-reduction mechanism J is reduced, the tooth numbers and sizes of the gears in the speed-reduction mechanism may be reduced to save cost.

Figure 2:
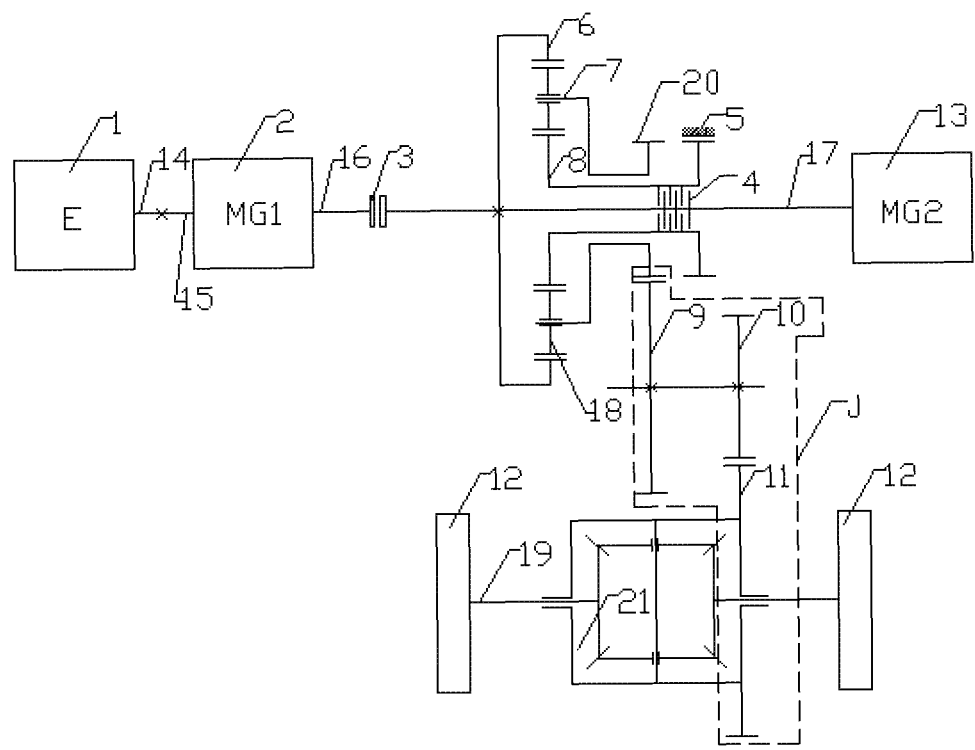
FIG. 2 is a schematic view of a hybrid power driving system of a vehicle according to another embodiment of the present invention, the character "X" thereof representing a fixed connection.
Figure 3:
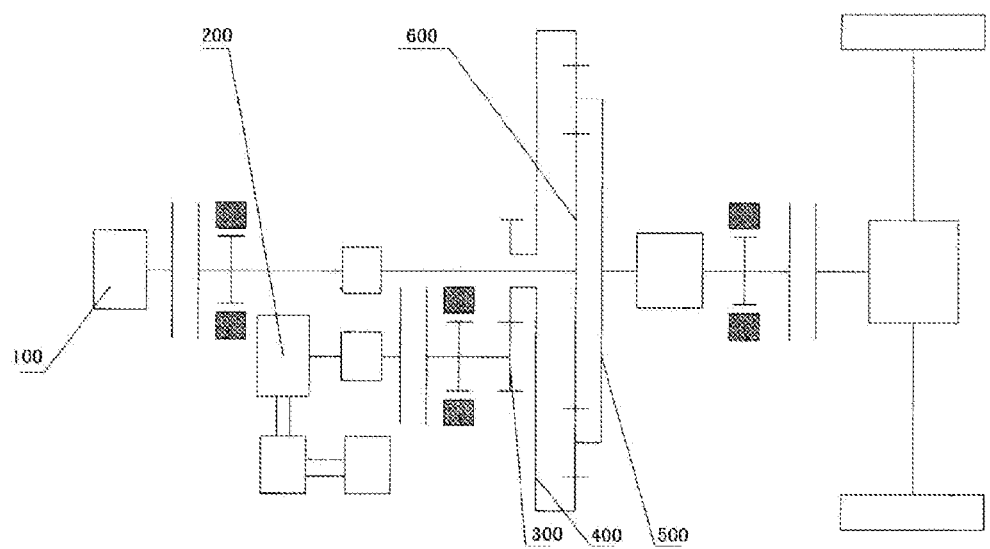
FIG. 3 is a schematic view of a hybrid power driving system of a vehicle according to Chinese patent CN2693516Y.

FIG. 2 shows a variant of the embodiment shown in FIG. 1. The basic structure of the variant is similar to the embodiment shown in FIG. 1, the difference being that the output shaft 17 of the second electric motor 13 is directly fixed to the ring gear 6, and the output shaft of the second electric motor 13 is connected to the sun gear 8 via the second clutch 4, which is used to connect or disconnect the output shaft of the second electric motor 13 with the sun gear 8. The second clutch 4 may have a similar structure as the first clutch 3 in FIG. 1, with only the difference that the driven friction disc is connected to the interior surface of the center hole of the sun gear 8 and the driving friction disc is directly connected to the output shaft 17 of the second electric motor 13. The driving friction disc may be moved to engage or disengage with the driven friction disc by a clutch operation mechanism (not shown). In addition, the brake 5 is mounted on the sun gear 8. In FIG. 2, the sun gear 8 has a face made specially to connect with the brake 5. In some embodiments of the present invention, the special structure of the sun gear 8 may have different configurations. For example, the brake 5 may be directly mounted on the end face of the sun gear 8.

As shown in FIG. 2, the arrangement may also realize two forward gears of the vehicle, as described below:

When the vehicle is in an operating condition such as climbing up a slope and needs increased torque, the brake 5 is applied to fix the sun gear 6 and the clutch 4 is disengaged. At that moment, the rotational speed of the sun gear n1=0, and the following formula (4) is satisfied:

$$n3 \cdot K = (1+K) \cdot n2$$

wherein the reduction ratio of the planetary coupling mechanism is $i_1 = n3/n2 = (1+K)/K$. Because the reduction ratio of the speed-reduction mechanism J is a predetermined value $i_2$ (FIG. 2 shows a two-stage speed-reduction mechanism, although the speed-reduction mechanism may be a one-stage or multiple stage speed-reduction mechanism), the reduction ratio of the entire hybrid power driving system is $i = i_1 \cdot i_2 = (1+K) \cdot i_2$, where $i_2$ is the reduction ratio of the first forward gear of the hybrid power driving system in FIG. 2. Although the reduction ratio of the first forward gear of this embodiment is less than the reduction ratio of the first forward gear of the embodiment in FIG. 1, the reduction ratio of the first forward gear may also satisfy the need of decreasing speed and increasing torque and provide an alternative for the present invention.

As shown in FIG. 2, when the second clutch 4 is engaged and the brake 5 is disengaged, because the ring gear 6 is connected with the sun gear 8 as one body via the output shaft 17 of the second electric motor 13, n1 is equal to n3 in the above formula (1), resulting the following formula (5):

$$n3 + n3 \cdot K = (1+K) \cdot n2$$

That is, n3=n2. In other words, when the planetary coupling mechanism is in this situation, the rotational speeds of the sun gear 8, the planet carrier 7 and the ring gear 6 are the same, resulting in direct transmission and the reduction ratio of the planetary coupling mechanism $i_1 = 1$. In this case, the reduction ratio of the entire hybrid power driving system $I = i_1 \cdot i_2 = i_2$, which is the reduction ratio of the second forward gear of the hybrid power driving system in FIG. 2. This reduction ratio is quite small (only dependent on the reduction ratio $i_2$ of the speed-reduction mechanism J). Similar to the embodiment shown in FIG. 1, this embodiment is suitable to a high speed operating condition of the vehicle.

According to the aforementioned analysis, the hybrid power driving system for a vehicle according to the present invention skillfully uses a planetary coupling mechanism not only as a power coupling mechanism but also for speed reduction. Therefore, two forward gears of the vehicle are added in addition to the continuously variable transmission of the second electric motor 13 to satisfy the driving need of a vehicle under different operating conditions.

With reference to FIGS. 1 and 2, the gear operation method and power modes of the vehicle under different working conditions are described in Table 1:

TABLE 1

|  |  |  | Operating components |  |  |
|---|---|---|---|---|---|
| Gear grade |  |  | first clutch | second clutch | brake |
|  | Parking gear |  | — | — | — |
|  | Reverse gear |  | ○ | ○ | ● |
|  | Neutral gear |  | ○ | ○ | ○ |
| Electric power model | first forward gear |  | ○ | ○ | ● |
|  | second forward gear |  | ○ | ● | ○ |
| Hybrid power drive model | Series | first forward gear | ○ | ○ | ● |
|  |  | second forward gear | ○ | ● | ○ |
|  | Series-parallel | first forward gear | ● | ○ | ● |
|  |  | second forward gear | ● | ● | ○ |
| Parking and power generation |  |  | ○ | — | — |

Notes:
○ is disengaged or disconnected,
● is engaged or connected,
— is engaged or disengaged.

As mentioned above, a hybrid power driving system of the present invention uses the second electric motor 13 as the main power supply. However, by means of the control device and the clutch, two operating modes may be achieved in the hybrid power driving system: pure electric mode (EV) and hybrid power mode (HEV). A detailed description follows.

First, in the parking gear, the internal-combustion engine 1, the first electric motor 2 and the second electric motor 13 all stop running. The first clutch 3, the second clutch 4 and the brake 5 may each be engaged or disengaged.

Second, in the reverse gear, the first clutch 3 is disengaged, and the vehicle is driven by the second electric motor 13. The fact that the first clutch 3 is disengaged does not mean that the internal-combustion engine 1 and the first electric motor 2 are not operating. If needed, the internal-combustion engine 1 may drive the first electric motor 2 to generate electric power. The electric power generated by the first electric motor 2 may be stored in the battery pack of the vehicle under the direction switch of the control device. When the first clutch 3 is disengaged, the internal-combustion engine 1 and the first electric motor 2 may operate in this mode, especially when the hybrid power serial model is adopted because of the lack of battery pack power. In the reverse gear, the second electric motor 13 may be reversed under the control of the control device with the second clutch 4 disengaged and the brake 5 engaged. Therefore, according to the two embodiments of the present invention in FIG. 1 and FIG. 2, the reduction ratios of the hybrid power driving systems in reverse are respectively $(1+K)\cdot i_2$ and $(1+K)\cdot i_2/K$. Because of the large reduction ratios and the variable speed of the second electric motor 13, the vehicle can reverse at a low speed to ensure the safety.

The third is the neutral gear, which is the temporary parking state. In this state, the second electric motor 13 does not stop running but the vehicle does not move. The first clutch 3, the second clutch 4 and the brake 5 are disengaged. Since the sun gear 8, the planet carrier 7 and the ring gear 6 of the planetary coupling mechanism are not fixed and no two components are joined, the planetary coupling mechanism cannot transmit any torque. As a result, the output speed of the planetary coupling mechanism is zero, even if the second electric motor 13 is running. Accordingly, the vehicle is stopped.

The fourth is a forward gear in a pure electric power mode. When the battery pack is fully charged, if the vehicle is under a high speed or a low speed operating condition, the hybrid power driving system of the present invention may use mainly the pure electric mode (EV), in which the second electric motor 13 may rotate in the forward direction under the control of the control device and may be the only power supply. In the pure electric mode, the hybrid power driving system has two forward gears. A description of the pure electric mode is described below.

In the first forward gear of the pure electric mode, the first clutch 3 and the second clutch 4 are disengaged and the brake 5 is engaged. The reduction ratios of the two hybrid power driving systems in FIG. 1 and FIG. 2 are $(1+K)\cdot i_2$ and $(1+K)\cdot i_2/K$, respectively. Due to the large reduction ratios, the vehicle may run at a low constant speed. Also, in the pure electric mode, the slow acceleration of the vehicle may be achieved by increasing the output power of the second electric motor 13.

In the second forward gear of the pure electric mode, the first clutch 3 is disengaged, the second clutch 4 is engaged, and the brake 5 is disengaged. As discussed above, the planetary coupling mechanism of each hybrid power driving system in FIG. 1 or FIG. 2 is in direct drive, and the reduction ratio of the entire hybrid power driving system is the reduction ratio $i_2$ of the speed-reduction mechanism J. In this case, the vehicle may run at a relatively high speed.

The fifth is the forward gear of the hybrid power serial mode. Referring to the above description of the related art, in the hybrid power serial mode, it is generally the case that the internal-combustion engine 1 drives the first electric motor 2 to generate electricity, which is either directly supplied to the second electric motor 13, or stored in the battery pack and then supplied to the second electric motor 13. Therefore, the second electric motor 13 functions as the direct power supply to drive the vehicle. This hybrid power driving mode is mainly used when the battery pack is not sufficiently charged, and the vehicle is driven at a constant high or low speed. The forward gear of the hybrid power serial mode is similar to the forward gear of the pure electric mode, the difference being that the internal-combustion engine 1 drives the first electric motor 2 to generate electricity which is supplied to the second electric motor 13. Therefore, as shown Table 1, the control of the clutches and brake of the first forward gear and second forward gear in the hybrid power serial mode may be referred to the first forward gear and second gear in the pure electric mode.

The sixth is the forward gear in the series-parallel mode of the hybrid power driving system. This mode is mainly used for the operating condition where the vehicle climbs up a slope or undergoes a rapid acceleration, and therefore needs a large power output. In this case, the first clutch 3 is engaged, the internal-combustion engine 1 and/or the first electric motor 2 assist the second electric motor 13 to provide more power. In this mode, there are multiple power transmitting lines to satisfy different driving needs. For example, when the internal-combustion engine 1 is running and the first electric motor 2 functions as a generator under the control of the control device, the first electric motor 2 converts a part of the power from the internal-combustion engine 1 into electric power for storage in the battery pack. The remaining power from the internal-combustion engine 1 is combined, via the output shaft 16 of the first electric motor, with the power produced by the second electric motor 13, and then transmitted to the speed-reduction mechanism J via the planetary coupling mechanism.

In this situation, the speeds of the internal-combustion engine 1 and the second electric motor 13 preferably match. Because the rotational speed of an electric motor is generally higher than that of an internal-combustion engine, the control device controls the rotational speed of the second electric motor 13 to match the rotational speed of the internal-combustion engine. Although the speed of the internal combustion engine 1 has a slight fluctuation, because the first clutch 3 may be of a friction type, the slight mismatch of the rotational speed of the internal-combustion engine 1 with the second electric motor 13 may not affect the driving operation of the vehicle. The principle is the same in the following speed matching.

For another example, when the internal-combustion engine 1 is running and the first electric motor 2 functions as an electric motor under the control of the control device, electric power is transmitted from the battery pack to the first electric motor 1 and second electric motor 13 under the control of the control device. The internal-combustion engine 1 and the second electric motor 13 may together assist the second electric motor 13, especially when the vehicle is climbing a maximum slope. In addition, when the electricity stored the battery pack is exhausted, the internal-combustion engine 1 starts to run, and the vehicle may be driven only by the internal-combustion engine 1. At the same time, the internal-combustion engine 1 may drive the first electric motor 1 (and in some cases the second electric motor 13) to generate electricity to charge the battery pack. According to embodiments of the present invention, in the series-parallel mode of the hybrid power driving system, there are multiple power transmission lines which have been used in multiple vehicle types. The most obvious advantage of the series-parallel mode is that the internal-combustion engine 1 may be kept in the maximum efficiency area and the output power of the internal-combustion engine 1 may be fully used. Regardless which power transmission line is used, the hybrid power driving system has two forward gears in the series-parallel mode, as described below.

In the first forward gear of the series-parallel mode of the hybrid power driving system, the first clutch 3 is engaged, the second clutch 4 is disengaged, and the brake 5 is applied. As discussed above, the reduction ratios of the two hybrid power driving system in FIG. 1 and FIG. 2 are respectively $(1+K) \cdot i_2$ and $(1+K) \cdot i_2 / K$. The reduction ratios are quite large so that the rotational speeds of the internal-combustion engine 1 and the second electric motor 13 (and/or the first electric motor 2) may be reduced to increase the output torque. Since the total output power is quite large, the increased torque ensures that the vehicle has enough power to climb up a slope.

In the second forward gear of the series-parallel mode of the hybrid power driving system, both the first clutch 3 and the second clutch 4 are engaged, and the brake 5 is not applied. As discussed above, the planetary coupling mechanisms of the two hybrid power driving system in FIG. 1 and FIG. 2 are in a direct transmission mode, and the reduction ratio of the entire hybrid power driving system is the reduction ratio of the speed-reduction mechanism $i_2$. The large output power allows the vehicle to accelerate rapidly, while the vehicle can be driven at a high constant speed in the pure electric mode.

Moreover, when the vehicle is parked with the second electric motor 13 stopped, by disengaging the first clutch 3, the internal-combustion engine 1 may drive the first electric motor 1 to generate electricity to charge the battery pack. During the parking and electricity generation gear, because the first clutch 3 is disengaged, it does not matter whether the second clutch 4 and the brake 5 are engaged or disengaged, and the internal-combustion engine 1 cannot transmit power to the planetary coupling mechanism.

Based on the above analysis, according to one embodiment of the present invention, the hybrid power driving system may have a flexible choice of multiple working conditions and gears accordingly. It is mainly driven by the second electric motor 13, and the internal-combustion engine 1 mostly works in the maximum efficiency area in the series-parallel mode of the hybrid power driving system, thus allowing the internal-combustion engine 1 to avoid operating at the idle speed and low speed conditions to improve fuel efficiency. In addition, the first electric motor 2 may also function as a starting motor for the traditional internal-combustion engine 1, giving the first electric motor 2 three functions: starting motor, generator and motor assisting the second electric motor 13. Moreover, a hybrid power driving system having two adjustable forward gears may effectively allow the vehicle to decrease the speed in order to increase the torque, so that the vehicle can start more quickly. In a high-speed condition, the maximum efficiency of the motor and engine may be utilized more to improve the efficiency for converting electric energy and to reduce exhaust emission and energy loss and to achieve high kinetic power.

Although explanatory embodiments have been shown and described, it would be appreciated by those skilled in the art that changes, alternatives, and modifications can be made in the embodiments without departing from spirit and principles of the invention. For example, the planetary coupling mechanism and the speed-reduction mechanism may be encapsulated into a shell. Such changes, alternatives, and modifications all fall into the scope of the claims and their equivalents.

The invention claimed is:

1. A hybrid power driving system for a vehicle, comprising:
   an internal-combustion engine;
   a first electric motor;
   a second electric motor;
   a planetary coupling mechanism;
   a speed-reduction mechanism; and
   a differential mechanism; wherein an output shaft of the internal-combustion engine is connected directly with an input shaft of the first electric motor; an output shaft of the first electric motor is connected with an output shaft of the second electric motor via a first clutch; the output shaft of the second electric motor is connected with one of a sun gear and a ring gear of the planetary coupling mechanism at a first position of the output shaft of the second electric motor along the axial direction of the output shaft of the second electric motor; and the output shaft of the second electric motor is connected with the other one of the sun gear and the ring gear at another position of the output shaft of the second electric motor along the axial direction of the output shaft of the second electric motor via a second clutch; a planet carrier of the planetary coupling mechanism is connected to an input gear of the speed-reduction mechanism; and an output gear of the speed-reduction mechanism is connected to a shell of the differential mechanism.

2. A gear position operation method of the hybrid power driving system of claim 1, wherein,
when the vehicle is in forward,
by disengaging the second clutch and engaging the brake, the hybrid power driving system is put into a first forward gear, or
by engaging the second clutch and disengaging the brake, the hybrid power driving system is put into a second forward gear;
when the vehicle is in reverse, by disengaging the first and second clutches and engaging the brake, the hybrid power driving system is put into a reverse gear;
when the vehicle is in neutral, by disengaging the first and second clutches and the brake, the hybrid power driving system is put into a neutral position;
when a vehicle is in parking and power generation, by disengaging the first clutch, the internal-combustion engine drives the first electric motor to generate electricity.

3. The gear position operation method of claim 2, wherein when the vehicle is in forward, by disengaging the first clutch and stopping running the internal-combustion engine, the vehicle is put into the first forward gear or second forward gear in a pure electric motor diving mode.

4. The gear position operation method of claim 2, wherein when the vehicle is in forward, by disengaging the first clutch and running the internal-combustion engine to drive the first electric motor to generate electricity, the vehicle is put into the first forward gear or second forward gear in a hybrid power serial mode.

5. The gear position operation method of claim 2, wherein when the vehicle is in forward, by engaging the first clutch and running the internal-combustion engine and/or the first electric motor, the vehicle is put into the first forward gear or second forward gear in a hybrid power series-parallel mode.

6. The hybrid power driving system of claim 1, wherein the other one of the sun gear and the ring gear has a brake, and wherein the brake is engageable with a peripheral surface of the other one of the sun gear and the ring gear.

7. The hybrid power driving system of claim 6, further comprising a hydraulic control mechanism for controlling each of the first clutch, the second clutch and the brake.

8. The hybrid power driving system of claim 1, wherein the output shaft of the internal-combustion engine, the input shaft and output shaft of the first electric motor, a center line of the planetary coupling mechanism and the output shaft of the second electric motor share the same axis.

9. A gear position operation method of the hybrid power driving system of claim 8, wherein,
when the vehicle is in forward,
by disengaging the second clutch and engaging the brake, the hybrid power driving system is put into a first forward gear, or
by engaging the second clutch and disengaging the brake, the hybrid power driving system is put into a second forward gear;
when the vehicle is in reverse, by disengaging the first and second clutches and engaging the brake, the hybrid power driving system is put into a reverse gear;
when the vehicle is in neutral, by disengaging the first and second clutches and the brake, the hybrid power driving system is put into a neutral position;
when a vehicle is in parking and power generation, by disengaging the first clutch, the internal-combustion engine drives the first electric motor to generate electricity.

10. The gear position operation method of claim 9, wherein when the vehicle is in forward, by disengaging the first clutch and stopping running the internal-combustion engine, the vehicle is put into the first forward gear or second forward gear in a pure electric motor diving mode.

11. The gear position operation method of claim 9, wherein when the vehicle is in forward, by disengaging the first clutch and running the internal-combustion engine to drive the first electric motor to generate electricity, the vehicle is put into the first forward gear or second forward gear in a hybrid power serial mode.

12. The gear position operation method of claim 9, wherein when the vehicle is in forward, by engaging the first clutch and running the internal-combustion engine and/or the first electric motor, the vehicle is put into the first forward gear or second forward gear in a hybrid power series-parallel mode.

13. The hybrid power driving system of claim 8, wherein the internal-combustion engine and the first electric motor are located on one side of the planetary coupling mechanism and the second electric motor is located on the other side of the planetary coupling mechanism, wherein the planet carrier is connected to the input gear of the speed-reduction mechanism via a hollow connecting shaft, and wherein the output shaft of the second electric motor passes through the hollow connecting shaft.

14. The hybrid power driving system of claim 13, wherein the planetary coupling mechanism and the speed-reduction mechanism are encapsulated into a shell.

15. A gear position operation method of the hybrid power driving system of claim 13, wherein,
when the vehicle is in forward,
by disengaging the second clutch and engaging the brake, the hybrid power driving system is put into a first forward gear, or
by engaging the second clutch and disengaging the brake, the hybrid power driving system is put into a second forward gear;
when the vehicle is in reverse, by disengaging the first and second clutches and engaging the brake, the hybrid power driving system is put into a reverse gear;
when the vehicle is in neutral, by disengaging the first and second clutches and the brake, the hybrid power driving system is put into a neutral position;
when a vehicle is in parking and power generation, by disengaging the first clutch, the internal-combustion engine drives the first electric motor to generate electricity.

16. The gear position operation method of claim 15, wherein when the vehicle is in forward, by disengaging the first clutch and stopping running the internal-combustion engine, the vehicle is put into the first forward gear or second forward gear in a pure electric motor diving mode.

17. The gear position operation method of claim 15, wherein when the vehicle is in forward, by disengaging the first clutch and running the internal-combustion engine to drive the first electric motor to generate electricity, the vehicle is put into the first forward gear or second forward gear in a hybrid power serial mode.

18. The gear position operation method of claim 15, wherein when the vehicle is in forward, by engaging the first clutch and running the internal-combustion engine and/or the first electric motor, the vehicle is put into the first forward gear or second forward gear in a hybrid power series-parallel mode.

* * * * *